(12) United States Patent
Nichols

(10) Patent No.: US 8,891,586 B1
(45) Date of Patent: Nov. 18, 2014

(54) SYSTEM, APPARATUS AND METHOD FOR IDENTIFYING TRANSMISSION FREQUENCIES FOR COMMUNICATING DATA

(75) Inventor: Steven Nichols, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1762 days.

(21) Appl. No.: 12/253,709

(22) Filed: Oct. 17, 2008

(51) Int. Cl.
  *H04B 1/00* (2006.01)
(52) U.S. Cl.
  USPC .......................................... 375/132
(58) Field of Classification Search
  USPC .......................................... 375/132
  See application file for complete search history.

(56) References Cited

U.S. PATENT DOCUMENTS

| | | | |
|---|---|---|---|
| 5,463,659 A | 10/1995 | Nealon et al. | |
| 5,758,290 A | 5/1998 | Nealon et al. | |
| 5,927,599 A | 7/1999 | Kath | |
| 6,028,885 A | 2/2000 | Minarik et al. | |
| 6,213,404 B1 | 4/2001 | Dushane et al. | |
| 6,700,920 B1 | 3/2004 | Partyka | |
| 6,778,902 B2 | 8/2004 | Hathiram et al. | |
| 6,859,450 B1 | 2/2005 | Mansfield | |
| 6,870,875 B1 | 3/2005 | Partyka | |
| 6,925,105 B1 | 8/2005 | Partyka | |
| 7,035,310 B1* | 4/2006 | Roberts | 375/132 |
| 7,050,906 B2 | 5/2006 | Hathiram et al. | |
| 7,224,713 B2 | 5/2007 | Partyka | |
| 7,301,986 B2 | 11/2007 | Partyka | |
| 2005/0047383 A1 | 3/2005 | Yoshida | |
| 2006/0227852 A1 | 10/2006 | Black | |
| 2007/0139183 A1* | 6/2007 | Kates | 340/521 |
| 2007/0291822 A1* | 12/2007 | Staley et al. | 375/132 |
| 2008/0219324 A1* | 9/2008 | Park et al. | 375/132 |

OTHER PUBLICATIONS

U.S. Appl. No. 12/253,613, filed Oct. 17, 2008, Nichols et al.
U.S. Appl. No. 12/253,696, filed Oct. 17, 2008, Nichols.
U.S. Appl. No. 12/253,698, filed Oct. 17, 2008, Kidder et al.
U.S. Appl. No. 12/253,772, filed Oct. 17, 2008, Kidder et al.

* cited by examiner

*Primary Examiner* — Tanmay Shah
(74) *Attorney, Agent, or Firm* — Seager Tufte & Wickhem LLC.

(57) ABSTRACT

Systems, apparatuses and methods for identifying frequencies for use in communicating data. Frequency hopping sequences are used in the communication of data without the need to store or exchange the sequences themselves. A seed value is obtained, and the frequency hopping sequence is calculated using the seed each time data is to be communicated using that frequency hopping sequence. The data is communicated via one or more frequencies in the calculated frequency hopping sequence.

21 Claims, 7 Drawing Sheets

SYSTEM, APPARATUS AND METHOD FOR IDENTIFYING TRANSMISSION FREQUENCIES FOR COMMUNICATING DATA

FIELD OF THE INVENTION

This invention relates in general to communications, and more particularly to systems, apparatuses and methods for utilizing frequency hopping sequences in the communication of data.

BACKGROUND OF THE INVENTION

Systems employing numerous devices often require or otherwise benefit from the ability for these devices to communicate with one another. While each device may have its own purpose and responsibilities, they may need to transmit information to, and/or receive information from, other devices of the system. Device-to-device communication may be accomplished by wiring the devices together, and communicating via the wires. Systems today are continually moving towards wireless communication, which generally makes installation more convenient, and among other things provides greater flexibility and scalability.

A drawback to wireless communication is that information transfer is not confined to a wire, as in a direct wired system. Rather, the information is transmitted over the air, and transmissions from neighboring systems can interfere with system communications. To address this issue, wireless network systems have employed various methods of transmitting radio signals, such as frequency hopping. Frequency hopping generally refers to a modulation technique where the signal carrier is rapidly switched among many frequency channels. Each party to the communication must know the frequency hopping sequence in order to know when it is to transmit at a certain frequency in the sequence. Using the frequency hopping sequence, transmitting devices can properly address targeted devices, and receiving devices can reject information from neighboring devices that are not within their system but within their reception range.

The selection of the ordered list of hopping frequencies in a frequency hopping sequence should be selected to minimize interference to and from neighboring systems sharing the same frequency space. However, because a device may be deployed anywhere, it is advantageous to determine the frequency hopping sequence during the installation of the devices of the system. When a frequency hopping sequence is determined during installation of a device, the complete sequence (or sequences) is typically stored in local memory of each device. This consumes valuable memory space and can increase cost, especially where the sequences are relatively long. Where sequences are shared among multiple devices, the entire hopping sequence must be transmitted to each device. This further requires potentially long message transfers of the hopping sequence, and can introduce security concerns particularly when transmitting the sequence over the air. Storing the sequence itself necessarily means that the sequence is available in the memory of each communication device, which can make the sequence further susceptible to security problems.

Accordingly, there is a need in the communications industry for systems, methods and apparatuses for utilizing frequency hopping sequences without experiencing the aforementioned and other problems associated with the prior art. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses systems, apparatuses and methods for identifying frequencies for use in communicating data. Among other things, present invention allows frequency hopping sequences to be used in the communication of data, without the need to store or transmit the sequences themselves.

In accordance with one embodiment of the invention, a method is provided that includes obtaining a seed value and, each time data is to be communicated using the frequency hopping sequence, calculating a frequency hopping sequence. The data is communicated via one or more frequencies in the calculated frequency hopping sequence.

In another embodiment, the method further involves determining which of the one or more frequencies in the calculated frequency hopping sequence the data is to be communicated. In one embodiment, the method further involves storing the last frequency of the frequency hopping sequence in which data was communicated, where communicating the data via one or more frequencies thus involves identifying the last frequency in which data was communicated, and communicating the data via the frequency following the last frequency in the frequency hopping sequence.

In another embodiment, the method further involves repeatedly determining that data is available to be communicated. In this embodiment, calculating the frequency hopping sequence involves calculating the frequency hopping sequence based on the seed value each time the available data is to be communicated.

The seed value can be obtained in any desired manner. In one embodiment, the method involves locally storing the seed value, and obtaining the seed value by retrieving the seed value from local storage. In another embodiment, the method involves locally generating the seed value, and obtaining the seed value by retrieving the locally-generated seed value from local storage. In yet another embodiment the method involves receiving the seed value from an external source and locally storing the seed value, and obtaining the seed value by retrieving the seed value from local storage. In still another embodiment, the method involves receiving a group identifier that uniquely identifies a group of communicating devices within an area at least encompassing a wireless communication range of the group of communicating devices, and using that group identifier as the seed value.

In another embodiment, the method further involves calculating a second frequency hopping sequence based on the seed value each time the data is to be communicated, and enabling transmission of the data at an identified frequency in the frequency hopping sequence when the identified frequency becomes active during successive frequency activations of the second frequency hopping sequence. In one embodiment the seed value used in generating the second frequency hopping sequence is the same seed as was used in generating the first frequency hopping sequence, thereby resulting in first and second frequency hopping sequences that have the same order of frequencies. In an alternative embodiment the seed value used in generating the second frequency hopping sequence is different from the seed used in generating the first frequency hopping sequence, thereby resulting in first and second frequency hopping sequences that have a different order of frequencies.

In another embodiment of such a method, communicating the data involves communicating a message at one frequency of frequency hopping sequence, and communicating subsequent messages at respective successive frequencies of the frequency hopping sequence.

In accordance with another embodiment of the invention, an apparatus is provided that includes storage to store a seed. The apparatus includes a sequence calculation module configured to receive the seed, and to generate a frequency hopping sequence based on the seed each time a message is to be transmitted. A frequency selection module receives the frequency hopping sequence generated by the sequence calculation module, and identifies a transmission frequency from the frequency hopping sequence in which to transmit the message.

According to one embodiment, the apparatus includes a transmitter coupled to the frequency selection module to receive the identification of the transmission frequency, and to wirelessly transmit the message via the transmission frequency.

According to one embodiment, the sequence calculation module is configured to recognize each time a message is ready for transmission, and to receive the seed and generate the seed-dependent frequency hopping sequence in response thereto.

In another embodiment of the apparatus, the storage further stores the last transmission frequency at which the last transmitted message was transmitted, and the frequency selection module retrieves the stored last transmission frequency, and identifies the frequency that immediately follows the last transmission frequency in the frequency hopping sequence as the transmission frequency in which to transmit the message.

In accordance with another embodiment, the sequence calculation module and frequency selection module are implemented using a processor programmed to execute instructions to receive the seed value, generate the frequency hopping sequence, and identify the transmission frequency or frequencies from the frequency hopping sequence in which to transmit the one or more messages.

In another embodiment, the apparatus further includes a seed generation module configured to generate the seed value stored in the storage.

Another embodiment of the apparatus includes a receiver configured to wirelessly receive the seed value, and a processor configured to store the seed value in the storage.

According to another embodiment, the seed corresponds to a group identifier used to identify a group of communicating devices that includes the apparatus and one or more other communicating devices, where the group identifier is unique to the group within a wireless transmission range of the group.

According to another embodiment, the storage stores a second seed, and the apparatus further includes a second sequence calculation module and a timing module. The second sequence calculation module is configured to receive the second seed, and to generate a second frequency hopping sequence based on the second seed each time the message is to be transmitted. The timing module receives the identified transmission frequency, and enables transmission of the message at the identified transmission frequency when the identified transmission frequency arises during successive frequency activations of the second frequency hopping sequence.

In accordance with another embodiment of the invention, a system is provided that includes at least one HVAC client device and at least one HVAC host device. The HVAC client device includes a programmed processor and/or circuitry to obtain a seed value, calculate a frequency hopping sequence based on the seed value each time a message is to be communicated using the frequency hopping sequence, and identify one of the frequencies of the frequency hopping sequence in which to transmit the message. The HVAC client also includes a transmitter or other communicating mechanism to communicate the message via the identified frequency. The HVAC host device includes a receiver to receive the message via the identified frequency in which the message was communicated by the HVAC client device.

In a more particular embodiment of such a system, the HVAC client further includes a programmed processor and/or circuitry to calculate a second frequency hopping sequence based on a second seed value each time the message is to be communicated using the frequency hopping sequence, and to enable transmission of the message when the identified frequency becomes active during successive frequency monitoring periods of the second frequency hopping sequence. In a more particular embodiment, the HVAC host device further includes a programmed processor and/or circuitry to successively monitor for messages at each of the frequencies of the second frequency hopping sequence.

In accordance with another embodiment, an apparatus is provided that includes at least storage and a processor. The storage stores at least a seed. The processor is configured to receive the stored seed each time a message is ready for transmission, and each time a message is ready for transmission to use the seed to identify the next transmission frequency of a frequency hopping sequence in which to transmit the message.

In a more particular embodiment, the storage may further store the last transmission frequency at which the last transmitted message was transmitted, and the processor may be further configured to receive the stored last transmission frequency, and to identify the frequency that immediately follows the last transmission frequency in the frequency hopping sequence as the next transmission frequency in which to transmit the message.

In still another embodiment, the seed may correspond to a group identifier used to identify a group of communicating devices that includes the apparatus and one or more other communicating devices, and where the group identifier is unique to the group within a wireless transmission range of the group.

In yet another embodiment, the storage may store a second seed. The processor may be further configured to receive the second seed, and to enable transmission of the message at the identified next transmission frequency of the frequency hopping sequence when the identified next transmission frequency arises in a second frequency hopping sequence determined using the second seed.

The above summary of the invention is not intended to describe every embodiment or implementation of the present invention. Rather, attention is directed to the following figures and description which sets forth representative embodiments of the invention.

BRIEF DESCRIPTION OF THE DRAWINGS

The invention is described in connection with the embodiments illustrated in the following diagrams.

DETAILED DESCRIPTION

Figure 1:
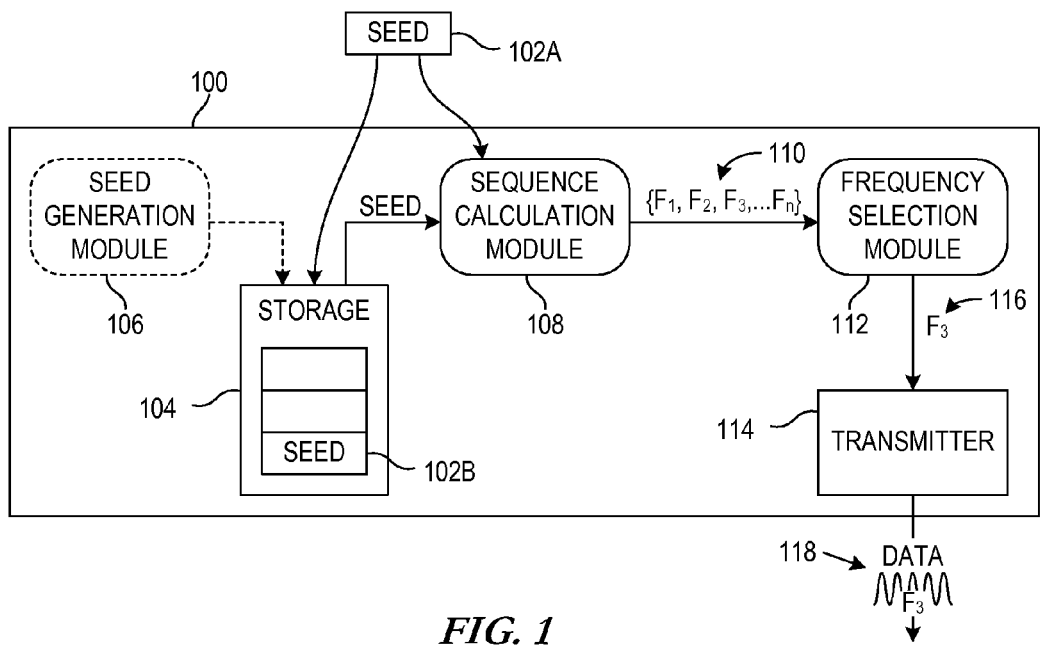
FIG. 1 illustrates an embodiment of a representative device capable of communicating information to and/or receive information from one or more other devices in accordance with the present invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for utilizing frequency hopping sequences in the communication of data. A stored or otherwise obtainable seed is used to generate a seed-dependent frequency hopping sequence each time data is to be transmitted.

In the prior art, a frequency hopping sequence may be created for use by communicating devices, where the frequency hopping sequence is stored at each of the communicating devices. For example, where the sequence is determined during installation of the communicating devices, the complete sequence is typically stored in local storage of each of the communicating devices. This consumes valuable memory space and can increase cost, especially where the sequences are relatively long. Where sequences are shared among multiple devices, the entire hopping sequence must be transmitted to each device. This further requires potentially long message transfers of the hopping sequence, and can introduce security concerns particularly when transmitting the sequence over the air. Storing the sequence itself necessarily means that the sequence is available in the memory of each communication device, which can make the sequence further susceptible to security problems. The present invention solves these and other problems associated with systems utilizing frequency hopping sequences.

The present invention enables frequency hopping sequences to be utilized without unnecessarily consuming excessive memory space at the communicating devices. In some embodiments the invention also avoids the need to transmit the sequence(s) between communicating devices, which reduces system overhead and transmission times, and alleviates security concerns. The present invention provides other advantages as will be evident from the following description.

In one embodiment a seed value is utilized, where the seed value is used to generate a corresponding frequency hopping sequence. In one embodiment, the same sequence generation algorithm using the same seed value will produce the same frequency hopping sequence; i.e. the hopping sequence may be made dependent on a seed where different values of the seed produce different hopping sequences. The seed value can be locally generated, and/or transmitted between devices. When transmitted between communicating devices, the seed value alone can be transmitted rather than the entire frequency hopping sequence. Using this seed value, the frequency hopping sequence is calculated each time it is to be used, such as when data is to be communicated via the frequency hopping sequence. In this manner, a device does not save the entire sequence in memory, but rather calculates all or a desired portion of the hopping sequence every time it needs it. The data can then be communicated via the next frequency(s) in the calculated frequency hopping sequence.

FIG. 1 illustrates an embodiment of a representative device 100 capable of communicating information to, and in some cases receiving information from, one or more other devices. The device 100 may represent any device capable of communicating data via a plurality of carrier frequencies. In one embodiment, the device 100 communicates messages via successive frequencies in a multi-frequency sequence of available frequencies, such as in the case of frequency hopping. It should be understood that "messages" as used here generally refers to a data block in any form or arrangement. Thus, a "message" as used herein may include any quantity of data in one or more data units (e.g. one or more packets, one or more frames, one or more data blocks, one or more data bursts, etc.). While each message may be sent using multiple frequencies of the frequency hopping sequence, one embodiment involves sending each message in its entirety at one frequency, and moving to the next frequency of the sequence for the next message transmission. Such a device 100 may repeatedly, periodically or sporadically send messages or other information to one or more receiving devices. Representative examples include thermostats and other Heating, Ventilation and Air Conditioning (HVAC) components, security system components, sensors, control devices, monitoring devices, etc.

In the embodiment of FIG. 1, a seed value 102A (or simply, "seed") is used in the generation of a frequency sequence. The seed 102A may be provided from an external source and stored in the storage 104. For example, the seed 102A may be provided by another device that will communicate with the device 100. In other embodiments the seed may be generated locally at the device 100, such as via the seed generation module 106. For example, a processor or other circuitry may be configured as a random number generator that creates a random value for use as a local seed that will serve as the input, and thus the basis, for its frequency hopping sequence.

The storage 104 represents any type of storage for digital data, such as read-only memory, random access memory, magnetic media, removable storage (e.g. FLASH memory), optical media, etc. In the description of FIG. 1, it is assumed that the storage 104 is non-volatile memory that preserves the seed 102B in storage 104 in the event of device power down. Whether locally generated or received from an external source, the seed 102A may be stored in one or more storage locations of the storage 104, as depicted by stored seed 102B.

In accordance with the embodiment of FIG. 1, the device 100 does not save its frequency hopping sequence in storage 104, but rather calculates the desired portion of the frequency hopping sequence each time it wants to transmit information. In the illustrated embodiment the hopping sequence is calculated by the sequence calculation module 108. Module 108 can be implemented using, for example, discrete components, a processor(s) executing software/firmware, etc. For purposes of FIG. 1 it is assumed that a processor is configured by a sequence calculation algorithm to perform the calculation of the frequency hopping sequence. For example, the locally-stored seed 102B may be retrieved from memory 104, or the seed 102A may be directly received from an external source or external memory, for use as an input value for the sequence calculation module 108.

Based on the value of the seed, the sequence calculation module 108 generates a frequency hopping sequence 110. In one embodiment, the sequence calculation module 108 is configured to recognize each time a message(s) is to be sent. For example, the sequence calculation module 108 may monitor a message queue (not shown) to determine if a message(s) is ready for transmission. The sequence calculation module 108 may be notified by other circuitry, modules, processing agents, or other mechanism that a message(s) is ready for transmission. Other criteria may be used to trigger module 108's recognition of an impending message, such as a timer expiration, occurrence of a predetermined event, etc. The sequence calculation module 108 can recognize that a message(s) is ready to be sent in any desired manner.

In one embodiment, using the same seed value as input to the sequence calculation module 108 always produces the same hopping sequence 110. In this manner, the same frequency hopping sequence 110 will be generated each time the sequence calculation module 108 uses the same seed 102A/B as its input. In one embodiment the sequence 110 is not stored, and only the seed 102A/B is stored which saves memory capacity in the storage 104. For example, storing fifty frequencies of a frequency hopping sequence may require fifty bytes of memory, where the seed 102B may consume only one or two bytes of memory. Memory capacity is further conserved where sequence lengths increases and/or where multiple sequences are stored.

The frequency selection module 112 selects the appropriate frequency(s) of the generated frequency hopping sequence 110 to use in sending a message(s) via the transmitter 114. A transmitter as described herein, such as transmitter 114, may represent a single transmitting element capable of transmitting messages at various frequencies, or may represent a plurality of transmitting elements each configured to transmit messages at a different frequency (or some combination thereof). In one embodiment the frequency selection module 112 selects the next one or more frequencies of the sequence, relative to the last frequency(s) used to transmit data. In a more particular example, the frequency selection module recognizes the last frequency of the sequence 110 that was used to transmit a message, and selects the immediately successive frequency of the sequence 110 to transmit the next message to be transmitted from the device 100. For example, if the last frequency used to transmit a message was frequency $F_2$, the frequency selection module 112 will then select $F_3$ 116 as the carrier frequency for the next message transmission. The result is that the desired data 118 is transmitted at a frequency $F_3$ 116. In other embodiments the frequency selection module 112 is combined with the sequence calculation module 108 such that the sequence calculation module 108 executes an algorithm to directly output the transmission frequency $F_3$ 116. As can be seen in the example of FIG. 1, the frequency hopping sequence 110 need not be stored, but rather is calculated based on the seed 102A/B each time data 118 is to be transmitted by the device 100.

It should be noted that the entire frequency hopping sequence 110 need not be generated per se. Rather, the sequence calculation module 108 and frequency selection module 112 may be implemented as a module that identifies the appropriate transmission frequency to send the next message. In other words, the generation of the "frequency hopping sequence" may involve only the generation of a relevant portion of that sequence, namely the particular frequency of the frequency hopping sequence in which the next message will be transmitted via the transmitter 114. Thus, references herein to generation of the frequency hopping sequence includes generation of the relevant portion (e.g., relevant frequency) of the frequency hopping sequence.

Figure 2:
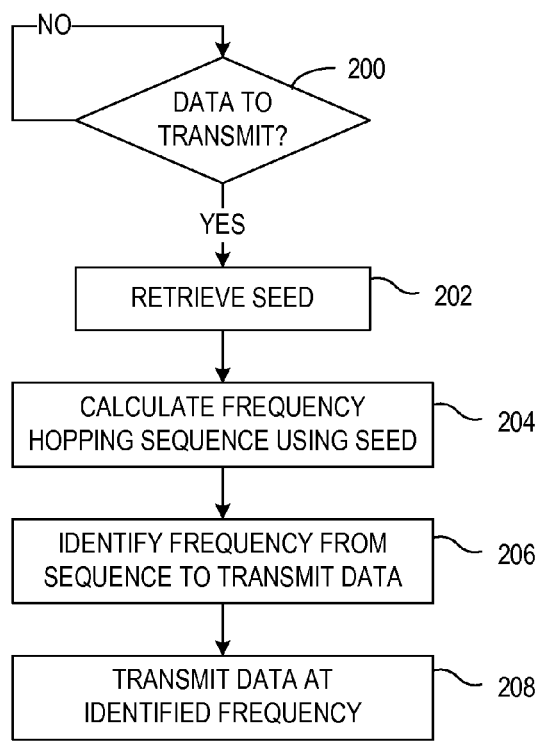
FIG. 2 is a flow diagram illustrating a representative method for on-demand sequence calculation in accordance with the invention.

FIG. 2 is a flow diagram illustrating a representative method for on-demand sequence calculation in accordance with the invention. If there is no data yet to transmit as determined at decision block 200, no frequency hopping sequence need even be available at the device. Rather, when it is time 200 to transmit data, the seed that will result in the transmitting device's hop sequence is retrieved 202.

The seed may be known to the communicating devices in advance, or may be provided to one or more of the communicating devices from another communicating device or elsewhere. The seed may also be locally generated. Embodiments of the invention may utilize a random or pseudo-random seed, which provides a random or pseudo-random resulting frequency hopping sequence. In one embodiment the seed is generated or selected to increase or enhance its uniqueness, whether or not it is generated randomly, pseudo-randomly, or by specific value assignment. A seed being "unique" in this sense may involve, but does not require, absolute exclusivity. For example, the seed may be locally unique such that other devices and/or neighboring systems in the area have a different seed value. As another example, the level of uniqueness of the seed may depend on the length of the seed value, such that a lengthier seed value has a lower probability of being duplicated by another device or neighboring system than a shorter seed value. In any event, it should be recognized that references herein to a unique seed value does not necessarily require absolute exclusivity from every other possible seed value.

In one embodiment, the seed may be based on another value that is already used by one or more of the communicating devices. As described in greater detail in subsequent embodiments, a house code used by a system to distinguish itself from neighboring systems may be used as a seed value. Since a house code may already be designed to be random or pseudo-random to increase the chances of the same house code being used in an area, the house code may also be used as the seed to generate a frequency hopping sequence that one, more or all of the communicating devices may use. For example, where a value already known to system is used as a seed, no additional data needs to be communicated among the communicating devices to share a hopping sequence.

Based on the particular seed value(s), the frequency hopping sequence is calculated 204. Any desired algorithm may be used to generate the sequence, or order, of the available frequencies using the seed value. In one embodiment, the entire frequency hopping sequence need not be calculated, but rather only enough of the sequence to know the next one (or more if necessary) frequency following the last frequency used to transmit data. As an example, the relevant frequency (i.e. the frequency in which pending data is to be transmitted) of the frequency hopping sequence may be based on the seed value and the last frequency used, whereby a single frequency is the output of calculating the "frequency hopping sequence." Calculating the frequency hopping sequence 204 therefore may involve calculating a small relevant portion, or up to all, of the entire frequency hopping sequence for the transmitting device.

When the relevant portion or all of the frequency hopping sequence is calculated, a frequency(s) from the sequence in which data will be transmitted is identified 206. This step may be integrated with the calculation 204 of the frequency hopping sequence where, for example, the seed value and the last frequency used are inputs to the calculation 204 and only a single frequency results from the calculation. In embodiments where a greater portion or all of the frequency hopping sequence is calculated 204, the particular one or more of the frequencies in which data is currently to be transmitted are identified 206. For example, the last frequency in which data has been transmitted can be stored for comparison to the currently calculated frequency hopping sequence, and the one or more frequency(s) following that stored last frequency can be identified as the frequency(s) in which to send the current data. When the frequency(s) has been identified 206, the data is transmitted 208 at that frequency(s).

Figure 3:
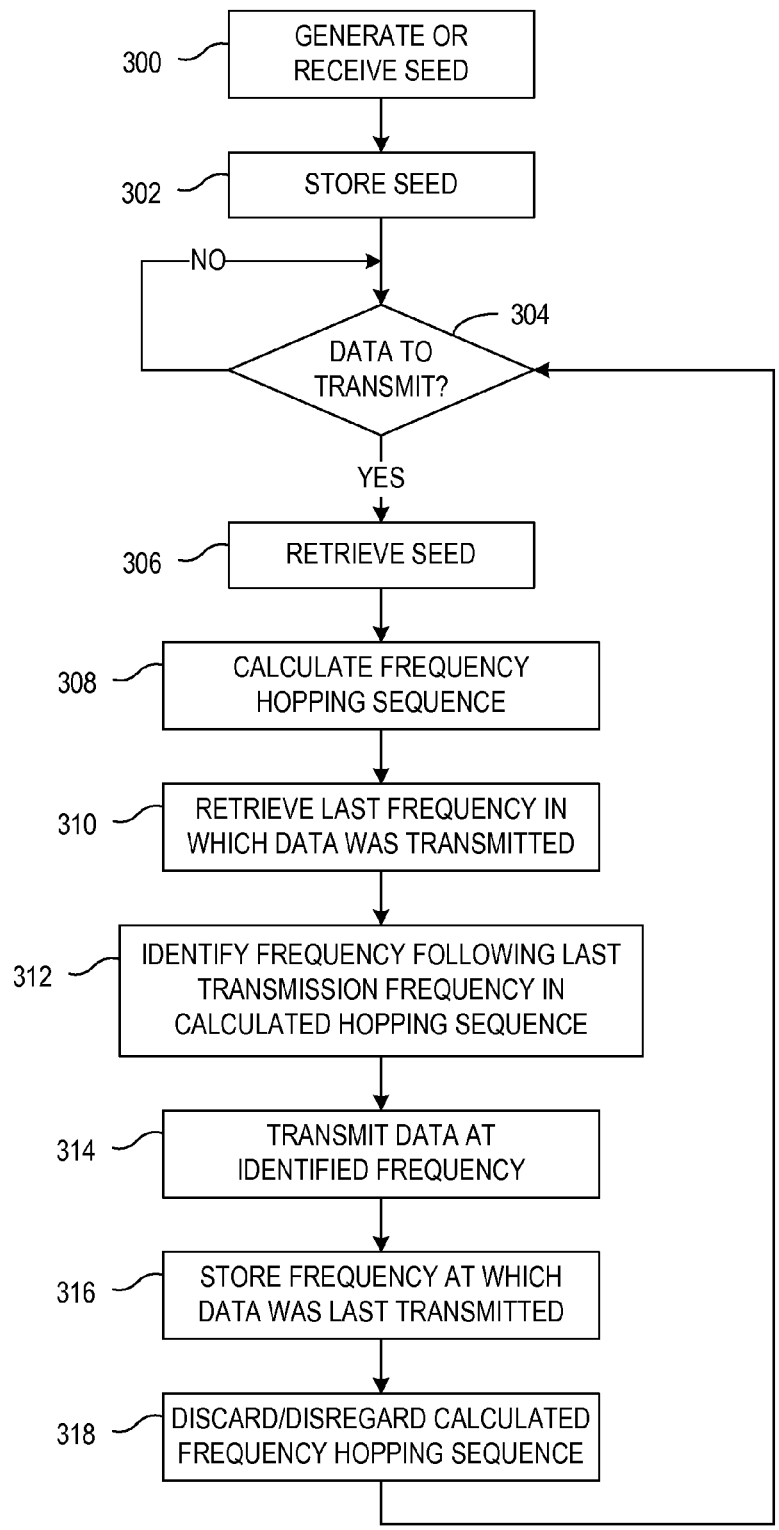
FIG. 3 is a flow diagram illustrating another representative embodiment of a method in accordance with the present invention.

FIG. 3 is a flow diagram illustrating another representative embodiment of a method in accordance with the present invention. A seed is received or generated 300. The seed is stored 302. While the seed may be stored remotely and accessed when needed, one embodiment involves locally storing the seed at the communicating device that will use that seed in the repeated generation of its frequency hopping sequence. When it is time for the device to transmit data as determined at decision block 304, the seed is retrieved 306 and used to calculate 308 a frequency hopping sequence, whether the complete sequence or a portion thereof. In the embodiment of FIG. 3, using the same seed in the calculation will result in the same frequency hopping sequence.

The last frequency in which data was transmitted is retrieved 310, such as from local memory. The frequency in the calculated frequency hopping sequence that follows the last frequency in which data was transmitted is identified 312, and data is then transmitted 314 from the device at that identified frequency. In one embodiment the data can be transmitted at a plurality of frequencies identified as following the last frequency in which data was transmitted. In another embodiment each message transmitted 314 is transmitted in its entirety using a single frequency carrier, such that the identified frequency 312 is used to transmit 314 one message.

In the embodiment of FIG. 3, the new data/message is transmitted 314 at the identified frequency, and that frequency is then stored 316 as the frequency from which data was last transmitted. This stored 316 frequency will be used in the next data transmission when it is retrieved at block 310.

In one embodiment, the frequency hopping sequence or portion thereof that was calculated 308 need not be stored locally or otherwise. Rather, it can be discarded or otherwise disregarded 318. For example, any calculated portion of the frequency hopping sequence can be removed from registers, volatile memory, or other memory. Or, it may remain in working memory without attempts to prevent it from being overwritten. As the frequency hopping sequence of FIG. 3 is calculated each time a message/data is to be communicated, there is no need to store the calculated frequency hopping sequence, and precious memory space is conserved.

When data has been transmitted, the device can again determine 304 whether a new message or data is to be sent. When that time arrives, the same seed is retrieved 306 to calculate 308 the same frequency hopping sequence (or at least the relevant portion thereof), and the new message/data is transmitted 314 at an identified frequency 312 following the last frequency in which data was transmitted. In the embodiment of FIG. 3, this process occurs each time the device needs or wants to communicate information.

It should be recognized that the order of functions does not need to occur precisely as shown in FIG. 3, but rather FIG. 3 merely displays various functions that can occur in embodiments of the invention. For example, the frequency at which data was last transmitted 316 does not need to be stored after the data is transmitted 314; the calculated hopping sequence does not have to be discarded 318 at the end of the process; the last frequency in which data was transmitted does not need to be retrieved 310 after the frequency hopping sequence is calculated 308; etc. The particular order of such functions are merely shown in a representative order in FIG. 3.

The invention may be applied in devices that utilize multiple frequency hopping sequences. In such a case a sequence calculation module may be provided for each of the hopping sequences to be calculated, or a single sequence calculation module may perform the calculation for two or more sequences. Different seeds may be used for each of the calculated sequences, or a single seed may be used for each of the calculation modules, where the algorithm of each calculation module produces a different sequence based on the same seed.

Figure 4:
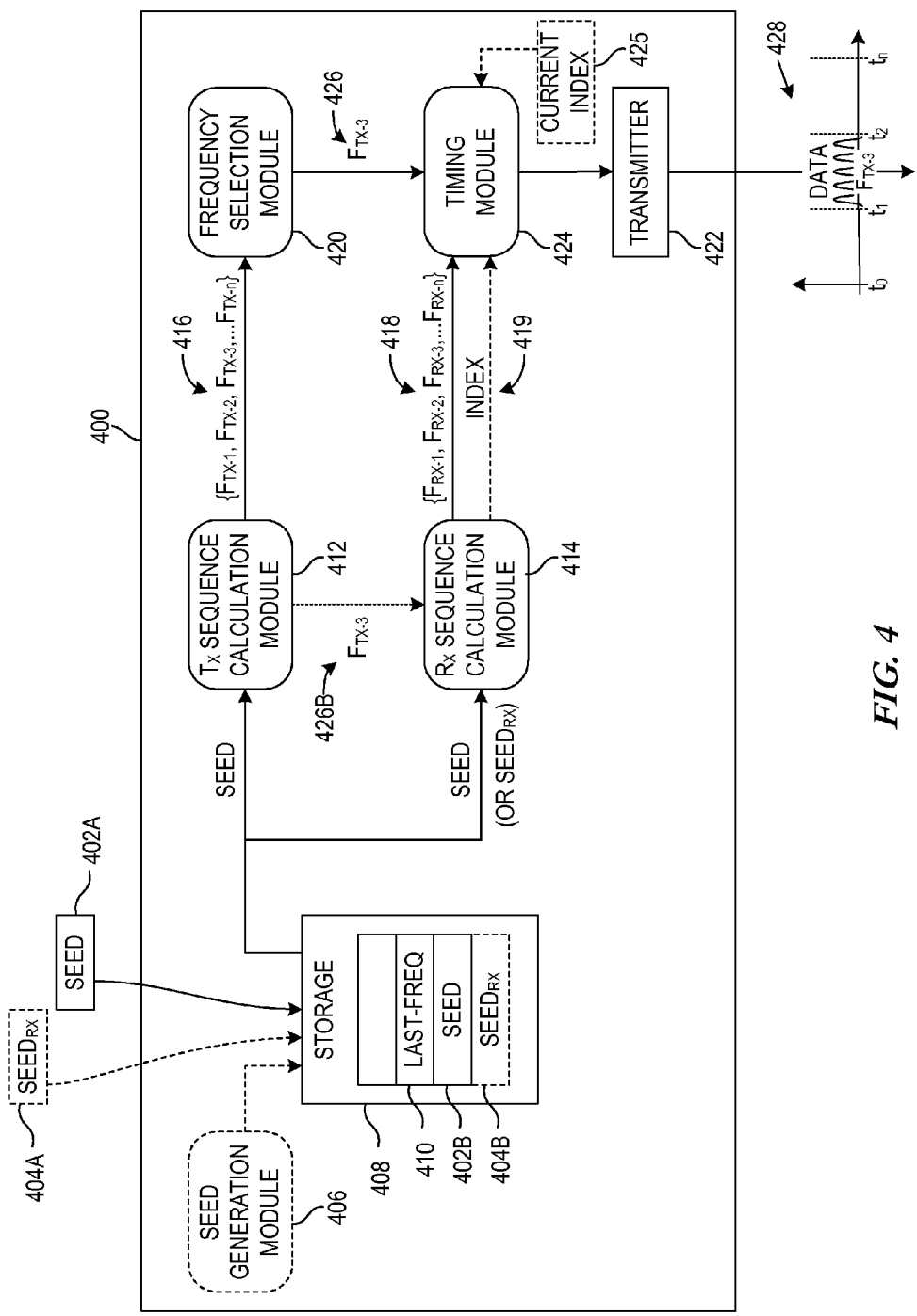
FIG. 4 is a block diagram illustrating a representative embodiment of a device capable of calculating multiple frequency sequences in accordance with the invention.

FIG. 4 is a block diagram illustrating a representative embodiment of a device capable of calculating multiple frequency sequences in accordance with the invention. One representative embodiment in which multiple frequency sequences are calculated is now described, and will be assumed for purposes of describing the representative embodiment of FIG. 4.

Multiple communication devices, including transmitting and receiving devices, may wirelessly communicate information among one another. The transmission of messages or other information can be sent at any of a plurality of available transmission frequencies. Frequency hopping is used to the extent that transmissions of information and receptions of communicated information take place according to the aforementioned "sequences" of communication frequencies. In the embodiment to be assumed for purposes of discussing FIG. 4, the receiving device(s) operates using a frequency hopping sequence that is different than the frequency hopping sequence used by the transmitting device(s). The transmitting device transmits information at the next available frequency of its frequency hopping sequence as described above, but does not transmit that information until that same frequency arises in the receiver's frequency hopping sequence. In such an embodiment the transmitter sequence determines which frequency to use in transmitting the information, and the receiver sequence determines when that transmission will occur. However, for the transmitting device to know when the receiving device(s) will be listening, it must also be privy to the receiver's frequency hopping sequence. The transmitting device can do this in accordance with the present invention by calculating the receiver's frequency hopping sequence in the manner described above.

For example, a plurality of frequencies may be available for use in any of the frequency hopping sequences that will be utilized. In the embodiment of FIG. 4, it is assumed that two pseudo-random sequences are used, where both sequences use the plurality of frequencies as the set of frequencies that are available for its respectfully sequence. Thus a first pseudo-random sequence is based on the available frequencies, and a second pseudo-random sequence is based on the same set of available frequencies. As a result, the first pseudo-random sequence has a sequence of frequencies in an order different than the order of frequencies of the second pseudo-random sequence.

In the embodiment of FIG. 4, it is assumed that the device 400 will transmit information to a receiving communicator (not shown). The receiving communicator will "listen" or otherwise monitor for information at one of its frequencies in the second pseudo-random sequence (hereinafter the receiver's pseudo-random sequence) for a time interval before then listening to the next frequency in the receiver's pseudo-random sequence. The device 400 is privy to the receiver's pseudo-random sequence in addition to knowing its own first pseudo-random transmission sequence (hereinafter the transmitter's pseudo-random sequence) by way of the seed and/or sequence calculation algorithm used to generate this receiver's pseudo-random sequence.

The device 400 uses the transmitter pseudo-random sequence to determine the frequency at which any pending information will be transmitted, as described above. The device 400 will transmit that information when the corresponding frequency becomes active in the receiver's pseudo-random sequence, which is also used by the receiving device to receive the transmitted information. As the receiving device(s) sequentially listens to each of the frequencies in its receiver pseudo-random sequence, the device 400 also tracks the receiver's pseudo-random sequence to know when the receiving device(s) will be receiving information at the device's 400 expected transmit frequency. The device 400 may be made aware of the receiver's pseudo-random sequence in any desired manner, such as generating the same receiver's pseudo-random sequence itself, receiving the receiver's pseudo-random sequence from one or more receiving device or elsewhere, etc. The timing in which the device 400 and the receiving device track the activation of frequencies in the receiver's pseudo-random sequence can be accomplished by any desired synchronization methodology. When the next frequency in the transmitter pseudo-random sequence arises at which the device 400 is to transmit information, it will wait to transmit that information until the same frequency arises in the receiver's pseudo-random sequence. For example, if the communicator 110 is to transmit a pending message at $F_N$, it will do so when the frequency $F_N$ arises in the receiver's pseudo-random sequence.

FIG. 4 is now considered with this representative embodiment in mind. In this embodiment, the device 400 calculates two frequency hopping sequences; one for the transmitting device to know which frequency should be used to transmit the next message, and one to know when the receiving device(s) will be listening to that frequency. Analogous to that described in FIG. 1, a seed value 402A is used in the generation of a first frequency sequence, such as the transmit frequency hopping sequence. The same seed 402A may be used to generate the second frequency sequence, such as the receive frequency hopping sequence. Alternatively, a different seed value ($SEED_{RX}$) 404A may be used to generate the receive frequency hopping sequence. The seed(s) may be received from an external source(s), or in one embodiment one or more of the seed values may generated locally via seed generation module 406. The storage 408 may be used to save the seed(s) 402A/404A as depicted by stored seed values 402B/404B. The storage 408 may also store the last frequency 410 from which a message was transmitted from the device 400.

For purposes of the example of FIG. 4, it is assumed that the same seed value 402A is used to generate multiple frequency hopping sequences. More particularly, the stored seed 402B is provided to both the transmit ($T_X$) sequence calculation module 412 and the receive ($R_X$) sequence calculation module 414. Based on this seed 402B, each of the modules 412, 414 respectively generates a transmit frequency hopping sequence 416 and a receive frequency hopping sequence 418, or relevant portions thereof as described in greater detail below. A frequency selection module 420 operates analogously to the frequency selection module 112 previously described, and thus selects the appropriate frequency(s) of the generated transmit frequency hopping sequence 416 to use in sending a message(s) via the transmitter 422.

However, in the embodiment of FIG. 4, the message is not sent via transmitter 422 until the identified transmit frequency arises in the receive frequency hopping sequence 418. The timing module 424, which may or may not be integral to the receiver sequence calculation module 414 and/or frequency selection module 420, determines when the selected frequency 426 arises in the receiver sequence calculation module 414. For example, if the timing module 424 determines that the identified transmit frequency 426 will occur in the receive frequency hopping sequence 418 two-hundred milliseconds in the future, then the timing module 424 enables transmission of the message via carrier frequency $F_{TX-3}$ 426 at that time.

In one embodiment, the timing module 424 is integrated with the $R_X$ sequence calculation module 414. In such an embodiment the algorithm executed via the module 414 may be passed at least two parameters, including the identified frequency (e.g. $F_{TX-3}$ 426) and the seed value 402B. Based on this information, the algorithm calculates when the identified frequency 426 will occur in the receive frequency hopping sequence 418, and can note a duration to wait to enable the transmitter 422 to transmit the message. Other manners of determining the timing may alternatively be implemented, such as comparing the active frequency of the receive frequency hopping sequence 418 to the identified frequency 426.

The result is that data 428 is transmitted at the identified frequency 426 at a time (e.g. time $t_1$) when the identified frequency 426 arises in the receive frequency hopping sequence 418. As can be seen in the example of FIG. 4, neither frequency hopping sequence 416, 418 need be stored, but rather they are calculated based on the seed 402B each time data 428 is to be communicated by the device 400.

In the illustrated embodiment, the $T_X$ sequence calculation module 412 is shown to generate the actual transmit frequency hopping sequence 416, and the receive $R_X$ sequence calculation module 414 is shown to generate the actual receive frequency hopping sequence 418. While this may be the case in some embodiments, other embodiments do not involve calculating the entire respective sequence, but rather an algorithm is used such as described below (Equation 1) to identify the particular transmission frequency to be used to transmit a message. Such an embodiment was noted above, which indicated that the module 412 may generate the relevant portions of the transmit frequency hopping sequence 416. In such an embodiment, the functionalities of the $T_X$ sequence calculation module 412 and the frequency selection module 420 may be combined to produce the identified frequency (e.g. $F_{TX-3}$ 426). In another embodiment, the frequency selection module 420 is not required because the algorithm executed via the $T_X$ sequence calculation module 412 outputs only a single transmission frequency (e.g., the frequency following the last frequency 410). In such a case, the entire "sequence" 416 may not be generated per se, but rather only the relevant transmission frequency is identified by way of the algorithm. This is depicted by the identified frequency $F_{TX-3}$ 426B being directly provided to the $R_X$ sequence calculation module 414.

In such an embodiment where the $T_X$ sequence calculation module 412 directly provides the identified frequency 426B, the $R_X$ sequence calculation module 414 can use the received frequency 426B in an algorithm as an index representative of its order in the $R_X$ sequence—i.e. where that frequency 426B will arise in the receiver's frequency hopping sequence. Knowing the current index 425 (i.e. which frequency is currently active in the receiver frequency hopping sequence), the timing module 424 can determine when the current index 425 corresponds to the received index 419, which signifies the time at which the transmission frequency 426B will be used by the transmitter 422 to transmit the data 428. As indicated above, the $R_X$ sequence calculation module 414 and timing module 424 may be combined such that the $R_X$ sequence calculation module 414 directly provides the identified transmission frequency 426B to the transmitter 422 at the appropriate time as determined by the algorithm of the $R_X$ sequence calculation module 414.

Figure 5:
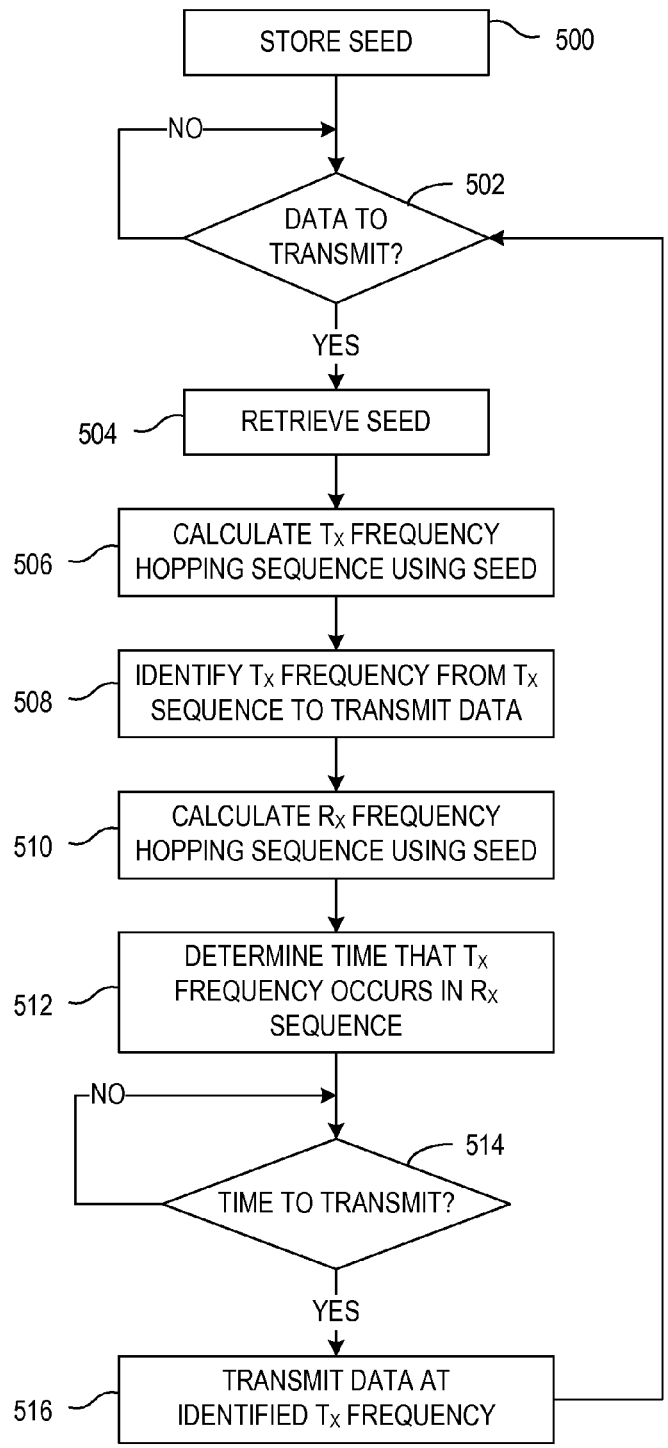
FIG. 5 is a flow diagram illustrating a representative method for continuously or otherwise repeatedly calculating multiple frequency sequences in accordance with the invention.

FIG. 5 is a flow diagram illustrating a representative method for continuously or repeatedly calculating multiple frequency sequences in accordance with the invention. The embodiment of FIG. 5 also assumes the use of both transmit and receive frequency hopping sequences as was described in connection with FIG. 4, although the principles of FIG. 5 can be applied in connection with any multi-sequence implementation. The embodiment of FIG. 5 also assumes that a single seed value is used in generating all frequency hopping sequences, although multiple seeds may be used.

A seed is stored 500, such as locally storing a seed at the communicating device. When data is to be transmitted as determined at decision block 502, the seed is retrieved 504. Using this seed, both the $T_X$ frequency hopping sequence and the $R_X$ frequency hopping sequence are calculated 506, 510. From the $T_X$ frequency hopping sequence, the $T_X$ frequency from the $T_X$ frequency hopping sequence in which data is to be transmitted is identified 508. The time that the $T_X$ frequency occurs in the $R_X$ frequency hopping sequence is determined 512, and when that time occurs 514, the data is transmitted 516 at the identified $T_X$ frequency.

As can be seen from FIG. 5, the process may continue by returning to the determination 502 of whether/when another message is to be transmitted. When that occurs, the same seed is retrieved 504, and the $T_X$ frequency hopping sequence and $R_X$ frequency hopping sequence are again calculated 506, 510 using that seed. The $T_X$ frequency identified 508 is, in one embodiment, the next $T_X$ frequency in the $T_X$ frequency hopping sequence relative to the $T_X$ frequency that was last used to transmit a message. Because the $R_X$ frequency hopping sequence may be different, and preferably is different than the $T_X$ frequency hopping sequence, the time that the $T_X$ frequency occurs in the $R_X$ frequency hopping sequence will likely be different than the last time determined at block 512. When it becomes time to transmit at block 514, the new message is transmitted at this "next" identified frequency 508. These calculations of the $T_X$ and $R_X$ frequency hopping sequences continues for each message or other data that is to be transmitted.

While any desired calculation of the frequency hopping sequence(s) may be used, a representative example is now described. The example again assumes an embodiment involving both $T_X$ and $R_X$ frequency hopping sequences, as was assumed in the descriptions of FIGS. 4 and 5. In this embodiment, the RF communications use fifty frequencies in the hopping sequence. Each device or "client" has a unique pseudo-random hopping sequence of the fifty frequencies that determines on what frequency its next message should be transmitted. Also, each group comprising at least one receiver or "host" and its clients share a common time synchronized pseudo-random hopping sequence that determine when a message with a particular frequency can be sent.

Each hop sequence in this embodiment is mathematically calculated from a 16-bit value each time it is referenced. This has numerous benefits, including that only two memory bytes are used to store each sequence. Further, in one embodiment, the shared sequence is based on a 16-bit group address that all devices share anyway, so no extra messages are necessary to distribute sequences.

Calculation of the frequency hopping sequence utilizes a seed. For example, assume there are fifty frequencies to be used in a hopping sequence. In one example of a frequency hopping sequence calculation, the fifty frequency identifiers (e.g., $F_0$, $F_1$, $F_2$, etc.) are arranged into two rows in sequential order (i.e. top row $F_0$-$F_{24}$ and bottom row $F_{25}$-$F_{49}$. This creates 25 frequency "pairs" with each pair spanning 25 frequency IDs (e.g., pairs $F_0/F_{25}$, $F_1/F_{26}$, etc.). The exemplary algorithm then involves dividing the set into three groups of frequency IDs: 0-24; 25-37; 38-49. Group 25-37 is shuffled based on the seed. Shuffling in this sense means moving the relative positions of the frequency IDs, but any shuffling methodology can be used. Group 38-49 is then shuffled in a like, or different manner. Because of the two rows of frequency IDs, shuffling these two groups results in a new list of pairs consisting of a member of group 0-12 with a member of group 25-37, and a list of pairs consisting of a member of group 13-24 with a member of group 38-49. Then, the pairs can be shuffled based on the seed, the order of random pairs reversed based on the seed, and the sequence becomes each column from left to right. Again it should be recognized that any frequency calculation algorithm may be used, and the above is provided merely to facilitate an understanding of what sequence generation based on a seed may involve.

An embodiment of the frequency calculation algorithm may be represented in the form:

$$\text{FreqID}=f(\text{Position},\text{Seed}) \text{ where:} \qquad \text{EQUATION 1}$$

FreqID=the ID of the frequency that occurs at Position.
Frequency IDs are assigned in increasing order where:
   0=the lowest frequency
   49=the highest frequency
f( )=the frequency calculation algorithm
Position=the position of the frequency in the sequence where
   0=the first position
   49=the last position
Seed=a 16 bit number that determines the hop sequence The above representative algorithm returns the identified frequency at the desired position. For example, the "position" may represent an incremented position relative to the last frequency used to transmit data. When the seed is used to generate the frequency hopping sequence, the "position" then identifies the proper frequency of the frequency hopping sequence to use for transmitting the current data. As can be seen, the algorithm can be adjusted to any number of available frequencies.

In the case of calculating the receive frequency hopping sequence, the desired output is the position in the $R_X$ sequence at which the identified frequency occurs. Such a frequency calculation algorithm may be represented in the form:

$$\text{Position}=f^{-1}(\text{FreqID},\text{Seed}) \qquad \text{EQUATION 2}$$

Knowledge of the position within the $R_X$ sequence enables a transmitting device to know when its identified transmit frequency will occur in the receive frequency hopping sequence. For example, a transmitting device can then transmit a message at its identified transmit frequency when it matches the position in the receive frequency hopping sequence by way of comparison. Such an example is described in co-pending application U.S. patent application Ser. No. 12/253,613, filed on Oct. 17, 2008, and entitled "System, Apparatus And Method For Communicating Messages Using Multiple Frequency Hopping Sequences," the content of which is incorporated herein by reference in its entirety. In another representative embodiment, a time interval until the position within the $R_X$ sequence arises can be calculated, and such a time interval can be counted off until it is time to send a message at the transmitter's identified transmit frequency. Other embodiments may also be used to determine the appropriate time to send the identified transmit frequency based on the knowledge of its equivalent frequency arising in the receive frequency hopping sequence.

In one embodiment, the algorithms above are used to configure a processor(s), CPU(s), computer(s), or other processing system to perform the functions of the algorithm. Alternatively, part or all of the algorithm may be implemented using discrete circuitry. Accordingly, hardware, firmware, software or any combination thereof may be used to perform the various functions and operations described herein.

An example of a computing arrangement capable of executing programs to perform the various functions described above is shown in FIG. 6. The functional modules used in connection with the invention may reside in any device in which data is to be communicated. As described more fully below, devices implementing the present invention include thermostats, environmental control devices, local and remote interfaces, sensors, and/or other devices that may be used in systems such as HVAC systems, security systems, area control systems, etc.

Figure 6:
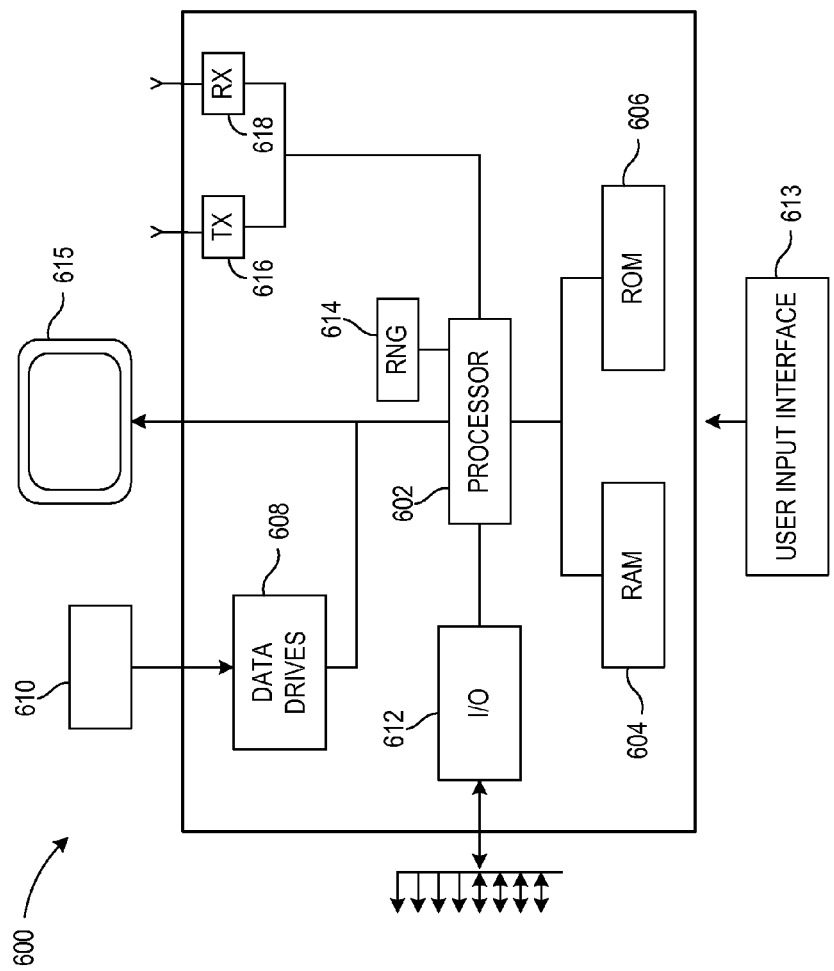
FIG. 6 illustrates a representative computing/processing arrangement capable of executing programs to perform functions in transmitting and/or receiving devices in accordance with the present invention.

Referring to FIG. 6, the representative computing or processing arrangement 600 includes a processing device(s), such as a central processing unit (CPU) 602. The computing system 600 includes some storage, such as any one or both of random access memory (RAM) 604 and read-only memory (ROM) 606. For example, seed values can be stored in RAM 604, while programs to perform frequency hopping sequence calculations can be stored in ROM 606 or other non-volatile storage. The computing arrangement 600 may instead or additionally include one or more data drives 608, such as disk drives, optical drives and/or other drives capable of receiving programs and/or data on transportable media 610. In one embodiment, software for carrying out the operations in accordance with the present invention may be stored and distributed on such media or other form of media capable of portably storing information. The software may also be transmitted to the computing arrangement 600 via data signals, such as being downloaded electronically via a network.

The processor 602 may communicate with other internal and external components, including removable storage (e.g. FLASH) through input/output (I/O) circuitry 612. I/O circuitry may also communicate control signals, communication signals, and the like. A user input interface 613 may be provided such as a mouse, keyboard/keypad, microphone, touch pad, trackball, joystick, touch screen, voice-recognition system, etc. Similarly, a user output device, such as a display 615 or speaker, may also be provided.

If random seed values are used, this can be facilitated by one or more random number generators (RNG). RNGs may be implemented using hardware, software operable in connection with the processor 602, or some combination of hardware and software. An RNG 614 may be integrally programmed as part of the processor 602 operation, or alternatively may be a separate RNG controller 614.

The representative computing arrangement 600 includes a transmitter(s) TX 616 and/or a receiver(s) RX 618. Such TX 616 and RX 618 components may be implemented as discrete components, or aggregated such as in the case of a transceiver. In one embodiment, the TX 616 and/or RX 618 are RF components capable of wirelessly communicating information via radio frequency waves.

As indicated above, the functions described in connection with the invention may be used in any device in which data is to be communicated. In one embodiment, the systems, apparatuses and methods of the invention are implemented in environmental monitoring and control systems, such as HVAC systems. Representative embodiments of such systems are generally described below. However, it should be recognized that the aforementioned systems, apparatuses and methods may be used in any communication device and associated system.

Environmental control systems can monitor and control numerous environmental and safety devices. These devices include, for example, thermostats, HVAC modules, equipment interfaces, sensors, remote controls, zoning panels, dampers, humidifiers and dehumidifiers, etc. It may be beneficial for some or all of these devices to communicate with each other wirelessly, which significantly eases installation and wiring complications. Wireless units also provide users with flexibility of use, and more options in positioning the devices. These and other advantages of implementing air interfaces have led to the use of the wireless transmission of some data in HVAC systems.

Figure 7:
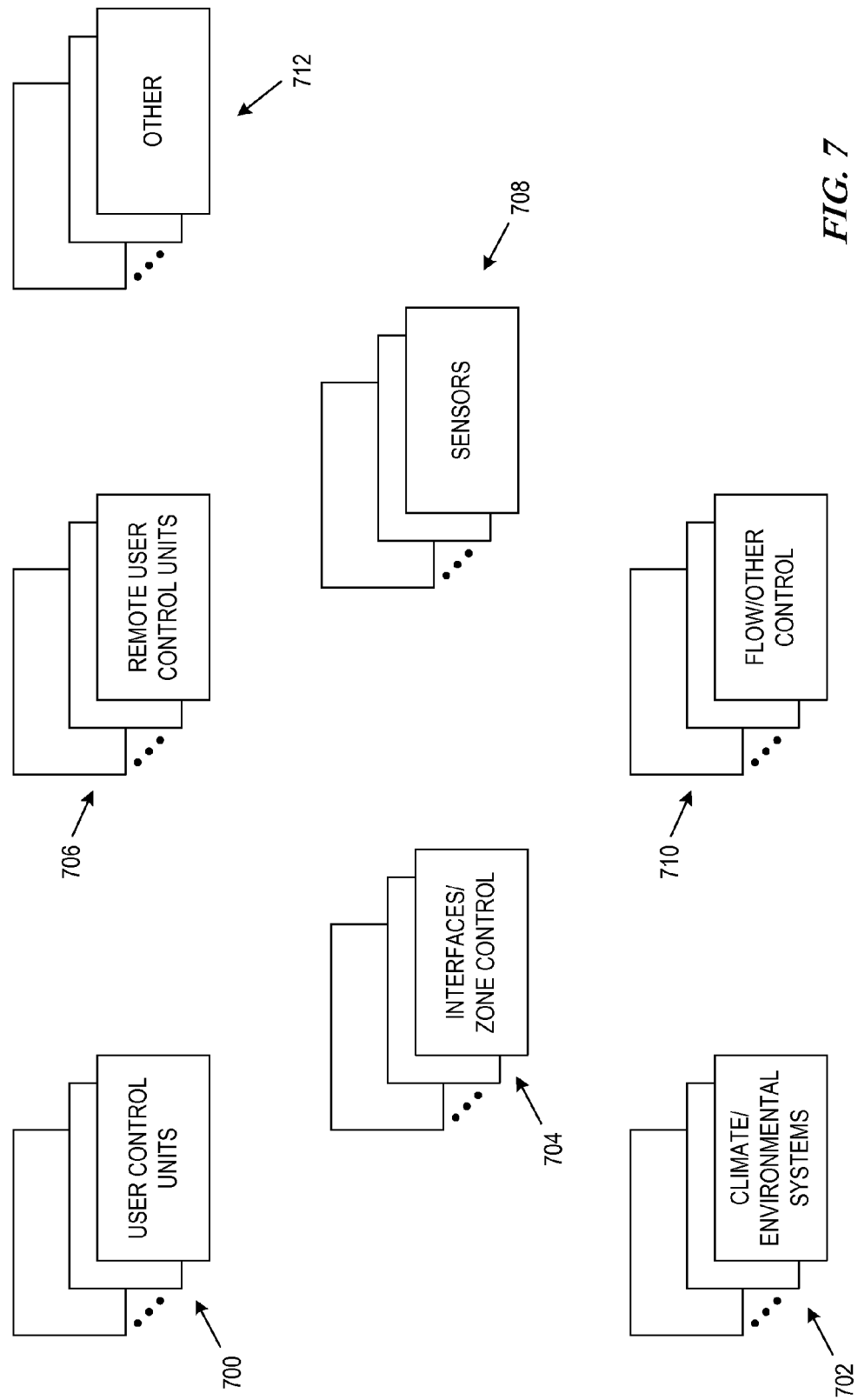
FIG. 7 is a block diagram generally illustrating representative HVAC elements and devices in which air interfaces may be used.

FIG. 7 is a block diagram generally illustrating representative HVAC elements and devices in which air interfaces may be used. FIG. 7 depicts one or more user control units 700, such as wireless thermostats where users can enter a temperature setpoint designating a desired temperature. Other examples of user control units 700 include humidity control units, lighting control units, security control units, etc. Climate or environmental systems 702 may include the equipment to cause the desired action to occur. One such system 702 is an HVAC system, which includes equipment to raise or lower temperature, humidity, etc. User control units 700 may communicate directly with such climate/environmental systems 702, and/or may communicate via one or more interfaces or zone controllers 704. Remote user control units 706 provide portable user control, such as providing a visual and/or audio interface to the user, and allowing the user to change environmental setpoints, check status, etc. Sensors 708 may be used to sense environmental conditions, and may be discrete devices (e.g. outdoor air/temperature sensor) or may be integrated into user control units 700. Flow and other control equipment 710 may also be used, such as dampers, ultraviolet air treatment lamps, etc. Any of these devices may need to communicate information amongst themselves and/or with other devices 712, in which the present invention may be utilized.

When these devices communicate wirelessly with one another via radio frequency (RF) or other wireless means, there is a reasonable chance that a wirelessly communicating device may experience interference from neighboring systems or other devices of the same system. Frequency hopping techniques as described above can be used in such systems to avoid such interference by continually changing the frequencies at which different devices transmit and receive data.

Some devices in such a system may be powered by power sources and communicate via wire and/or over the air, while other devices may be battery-powered and communicate information wirelessly. Any device may be powered in any desired manner, including battery or other DC power, AC power, energy harvesting, etc. In one embodiment, devices that are powered by power sources, such as 24 volts AC (VAC), are referred to as "hosts," and may remain powered on while operating in the system. Other devices that are powered by battery may be referred to as "clients," and may enter a sleep mode to preserve battery life. A collection of devices including a host(s) and its clients may be referred to as a "group." A collection of physical groups that communicate through their host(s) may be referred to as a "system." However, a "system" as otherwise used herein does not require any such groupings, and may involve as few as two communicating devices.

During installation or at other designated times, each host may generate a random group ID, which in one embodiment is a 16-bit group ID. This ID is used in messages to restrict its messages to only be received within its group. In one embodiment of the invention, this 16-bit group ID is also used as the seed value for that group, from which at least the shared $R_X$ frequency hopping sequence can be generated. As this group ID is already provided to each client for other purposes, using the group ID as the seed for a frequency hopping sequence avoids having to transmit any other information relating to the frequency hopping sequence. Additionally, each client may create a random device ID that is separate from the host's group ID, when it enrolls or otherwise registers with its host. In one embodiment, this device-specific device ID is used as a seed to derive its $T_X$ frequency hopping sequence.

Figure 8A:
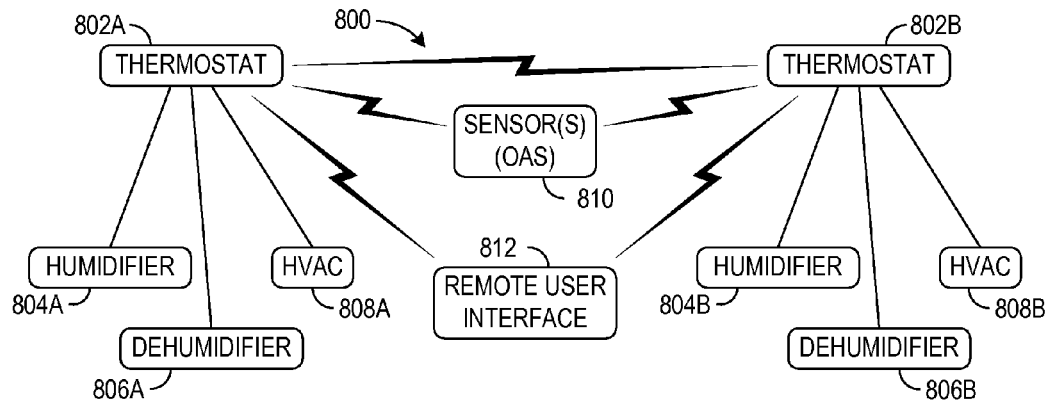
FIGS. 8A-8C depict some representative examples of clients, hosts, groups and systems that may benefit from communicating in accordance with the present invention.
Figure 8B:
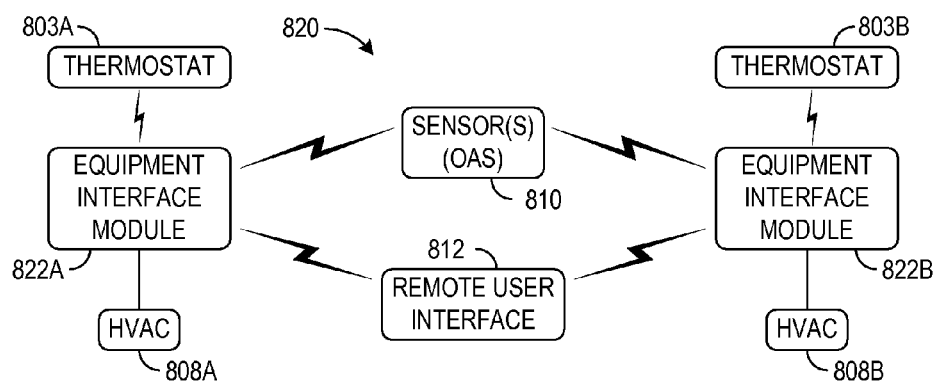
Figure 8C:
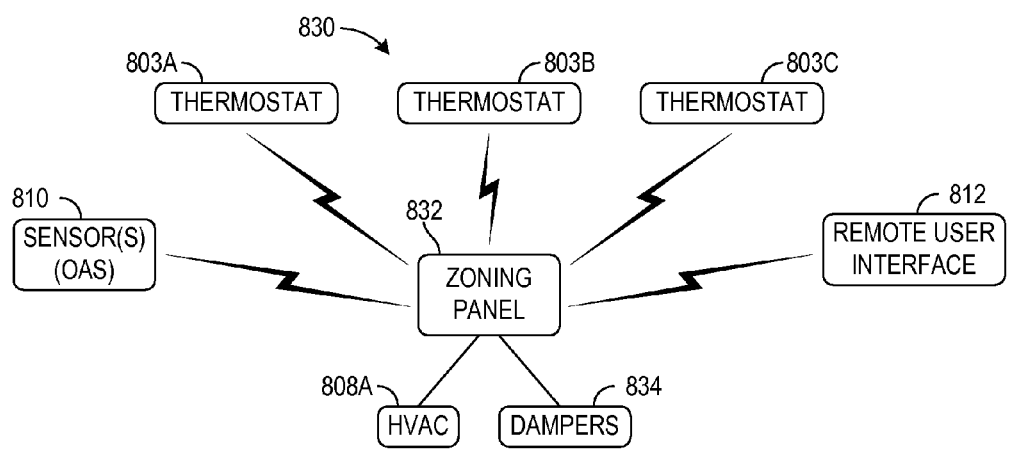

FIGS. 8A-8C depict some representative examples of clients, hosts, groups and systems that benefit from communicating in accordance with the present invention. Like reference numbers are used for analogous devices where appropriate in FIGS. 8A-8C. Each of the devices depicted in FIGS. 8A-8C may be powered in any desired manner, such as via an AC power source, battery or other DC power source, employing energy harvesting such as solar cells, etc. Thus, the examples below that reference possible power sources for various devices are merely representative embodiments for purposes of illustration.

FIG. 8A illustrates one system 800 where one or more thermostats 802A, 802B are configured as hosts, and may be powered by an AC power source, DC source or other power source. Each thermostat may be wired to other equipment such as humidifiers 804A, 804B, dehumidifiers 806A, 806B, and HVAC equipment 808A, 808B. Battery powered clients in the embodiment of FIG. 8A include one or more sensors 810, such as an outdoor air sensor (OAS), and one or more remote user interfaces (RUI) 812 which provide users with remote access and control of environmental conditions in the system 800. Thus, clients such as the RUI 812 and hosts such as the thermostats 802A, 802B can implement the principles of the present invention to calculate the $T_X$ frequency hopping sequence and $R_X$ frequency hopping sequence each time it needs to transmit information, such as was described in connection with FIGS. 1-6.

FIG. 8B illustrates another exemplary system 820 where one or more thermostats 803A, 803B are configured as clients, and may be powered by batteries. Each thermostat 803A, 803B respectively communicates wirelessly with an equipment interface module (EIM) 822A, 822B that may be AC-powered and wired to respective HVAC equipment 808A, 808B. In this embodiment, each EIM 822A, 822B operates as a host and may communicate with various clients. For example, host EIM 822A can communicate wirelessly with clients including the thermostat 803A, the sensor(s) 810, and the RUI(s) 812. Similarly host EIM 822B can communicate wirelessly with clients including the thermostat 803B, the sensor(s) 810, and the RUI(s) 812. Client such as the thermostats 803A, 803B and hosts such as EIMs 822A, 822B can implement the principles of the present invention to calculate the $T_X$ frequency hopping sequence and $R_X$ frequency hopping sequence each time it needs to transmit information, such as was described in connection with FIGS. 1-6.

FIG. 8C illustrates another system 830 which utilizes area zoning using a zoning panel 832. In this embodiment, the zoning panel 832 serves as a host that may be AC-powered, and is connected to other equipment such as the HVAC 808A and dampers 834. Clients include the thermostats 803A, 803B, 803C, a sensor(s) 810, RUI 812, and possibly dampers 834 when such dampers are wirelessly controlled. Client such as the thermostats 803A, 803B, 803C and hosts such as the zoning panel 832 can implement the principles of the present invention to calculate the $T_X$ frequency hopping sequence and $R_X$ frequency hopping sequence each time it needs to transmit information, such as was described in connection with FIGS. 1-6.

The above exemplary environments in FIGS. 7 and 8A-8C are provided merely for purposes of facilitating an understanding of representative systems in which the principles of the present invention may be employed. From the description provided herein, one skilled in the art can readily appreciate that the invention may be employed in any system of two or more communicating devices where messages or other data is communicated via frequency-based carrier signals.

The functions associated with the present invention may be performed by discrete circuitry and/or computing system hardware. In one embodiment, the devices that will communicate with one another utilize a processor(s), CPU(s), computer(s), or other processing system to perform the stated functions. Reference to a "processor" or other analogous term may involve a single processing device or multiple processing devices, such as co-processors, master/slave processors, etc. Accordingly, hardware, firmware, software or any combination thereof may be used to perform the various functions and operations described herein.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, terms such as "modules" and the like as used herein are intended to include a processor-executable program that exists permanently or temporarily on any computer-usable medium or in any transmitting medium which transmits such a program. Such "modules" may also be implemented using discrete circuits.

As indicated above, memory/storage devices include, but are not limited to, disks, optical disks, removable memory devices such as smart cards, SIMs, WIMs, semiconductor memories such as RAM, ROM, PROMS, etc. Transmitting mediums in which programs can be provided include, but are not limited to, transmissions via wireless/radio wave communication networks, the Internet, intranets, telephone/modem-based network communication, hard-wired/cabled communication network, satellite communication, and other stationary or mobile network systems/communication links.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

What is claimed is:

1. A method comprising:
   obtaining a seed value;
   calculating a transmission frequency of a frequency hopping sequence based on the seed value and a position within the frequency hopping sequence each time data is to be communicated via a device using the frequency hopping sequence, wherein the frequency hopping sequence comprises a random sequence generated using the seed value as a random seed;
   communicating the data via the transmission frequency; and
   storing the last frequency of the frequency hopping sequence in which data was communicated, and wherein communicating the data via the transmission frequency comprises identifying the last frequency in which data was communicated, and communicating the data via the frequency following the last frequency in the frequency hopping sequence.

2. The method of claim 1, further comprising repeatedly determining that data is available to be communicated, and wherein calculating the frequency hopping sequence comprises calculating the frequency hopping sequence based on the seed value each time the available data is to be communicated.

3. The method of claim 1, further comprising determining which of the one or more frequencies in the calculated frequency hopping sequence the data is to be communicated.

4. The method of claim 1, further comprising locally storing the seed value, and wherein obtaining the seed value comprises retrieving the seed value from local storage.

5. The method of claim 1, further comprising locally generating the seed value, and wherein obtaining the seed value comprises retrieving the locally-generated seed value from local storage.

6. The method of claim 1, further comprising receiving the seed value from an external source and locally storing the seed value, and wherein obtaining the seed value comprises retrieving the seed value from local storage.

7. The method of claim 1, wherein communicating the data comprises communicating a message at one frequency of the frequency hopping sequence, and communicating subsequent messages at respective successive frequencies of the frequency hopping sequence.

8. A method comprising:
   receiving a group identifier that uniquely identifies a group of communicating devices within an area at least encompassing a wireless communication range of the group of communicating devices, and using the group identifier as a seed value;
   calculating a transmission frequency of a frequency hopping sequence based on the seed value and a position within the frequency hopping sequence each time data is to be communicated via a device using the frequency hopping sequence, wherein the frequency hopping sequence comprises a random sequence generated using the seed value as a random seed; and
   communicating the data via the transmission frequency.

9. A method comprising:
   obtaining a seed value;
   calculating a transmission frequency of a first frequency hopping sequence based on the seed value and a position within the first frequency hopping sequence each time data is to be communicated via a device using the first frequency hopping sequence, wherein the first frequency hopping sequence comprises a random sequence generated using the seed value as a random seed;
   calculating a second frequency hopping sequence based on the seed value each time the data is to be communicated; and
   communicating the data via the transmission frequency when the transmission frequency becomes active during successive frequency activations of the second frequency hopping sequence.

10. An apparatus comprising:
    storage to store a seed;
    a sequence calculation module configured to receive the seed, and to generate at least part of a frequency hopping sequence based on the seed each time a message is to be transmitted, wherein the frequency hopping sequence comprises a random sequence generated using the seed value as a random seed;
    a frequency selection module coupled to receive the frequency hopping sequence generated by the sequence calculation module, and configured to identify, based on a position in the frequency hopping sequence, a transmission frequency from the frequency hopping sequence in which to transmit the message;
    wherein the storage further stores the last transmission frequency at which the last transmitted message was transmitted; and
    the frequency selection module is further configured to retrieve the stored last transmission frequency, and to identify the frequency that immediately follows the last transmission frequency in the frequency hopping sequence as the transmission frequency in which to transmit the message.

11. The apparatus of claim 10, further comprising a transmitter coupled to the frequency selection module to receive the identification of the transmission frequency, and to wirelessly transmit the message via the transmission frequency.

12. The apparatus of claim 10, wherein the sequence calculation module is configured to recognize each time a message is ready for transmission, and in response, to receive the seed and generate the seed-dependent frequency hopping sequence.

13. The apparatus of claim 10, further comprising a processor comprising the sequence calculation module and the frequency selection module, the processor configured to execute instructions to receive the seed value, generate the frequency hopping sequence, and identify the one or more transmission frequencies from the frequency hopping sequence in which to transmit the one or more messages.

14. The apparatus of claim 10, further comprising a seed generation module configured to generate the seed value stored in the storage.

15. The apparatus of claim 10, wherein the seed corresponds to a group identifier used to identify a group of communicating devices that includes the apparatus and one or more other communicating devices, and wherein the group identifier is unique to the group within a wireless transmission range of the group.

16. The apparatus of claim 10, wherein the storage stores a second seed, and further comprising:
- a second sequence calculation module configured to receive the second seed, and to generate a second frequency hopping sequence based on the second seed each time the message is to be transmitted; and
- a timing module coupled to the second sequence module, and coupled to the frequency selection module to receive the identified transmission frequency, and configured to enable transmission of the message at the identified transmission frequency when the identified transmission frequency arises during successive frequency activations of the second frequency hopping sequence.

17. An apparatus comprising:
storage to store a seed;
a processor configured to:
- receive the stored seed;
- calculate a current position of a frequency hopping sequence based on the seed value and a current frequency within the frequency hopping sequence, wherein the frequency hopping sequence comprises a random sequence generated using the seed value as a random seed;
- transmit a message via one or more frequencies in the frequency hopping sequence based on the current position;

the storage further stores the last transmission frequency at which the last transmitted message was transmitted; and the processor is further configured to receive the stored last transmission frequency, and to identify the frequency that immediately follows the last transmission frequency in the frequency hopping sequence as the next transmission frequency in which to transmit the message.

18. The apparatus of claim 17, wherein the seed corresponds to a group identifier used to identify a group of communicating devices that includes the apparatus and one or more other communicating devices, and wherein the group identifier is unique to the group within a wireless transmission range of the group.

19. The apparatus of claim 17, wherein the storage stores a second seed, and wherein the processor is further configured to receive the second seed, and to enable transmission of the message at the identified next transmission frequency of the frequency hopping sequence when the identified next transmission frequency arises in a second frequency hopping sequence determined using the second seed.

20. The apparatus of claim 17, wherein the current position is determined based on a receive frequency hopping sequence, and wherein the data is communicated based on determining that the one or more frequencies match a position in the receive frequency hopping sequence.

21. The apparatus of claim 17, wherein the random sequence comprises a pseudo-random sequence.

* * * * *